United States Patent
Flanagan et al.

[11] Patent Number: 6,050,419
[45] Date of Patent: Apr. 18, 2000

[54] PALLET WRAP AND METHODS FOR STABILIZING AND DISPLAYING ARTICLES

[75] Inventors: Therese A. Flanagan, Chicago; Keith C. Evans, Farmer City, both of Ill.

[73] Assignee: Kraft Foods, Inc., Northfield, Ill.

[21] Appl. No.: 09/234,347

[22] Filed: Jan. 20, 1999

[51] Int. Cl.[7] .................................................. B65D 19/44
[52] U.S. Cl. .............................. 206/597; 53/399; 53/441
[58] Field of Search ................................. 206/386, 597, 206/600; 53/399, 441, 447

[56] References Cited

U.S. PATENT DOCUMENTS

| | | |
|---|---|---|
| 2,192,423 | 3/1940 | Ward et al. . |
| 2,194,220 | 3/1940 | Elder . |
| 2,810,474 | 10/1957 | Essick . |
| 2,950,040 | 8/1960 | Bolding . |
| 3,371,815 | 3/1968 | Macomber . |
| 3,413,689 | 12/1968 | Powell et al. . |
| 3,971,504 | 7/1976 | Whyte . |
| 4,238,070 | 12/1980 | Lyons . |
| 4,311,239 | 1/1982 | Schlicker .................................. 206/597 |
| 4,738,371 | 4/1988 | Wakeman . |
| 4,852,330 | 8/1989 | Carangelo . |
| 4,868,955 | 9/1989 | Magnant et al. . |
| 4,876,841 | 10/1989 | Jensen . |
| 4,877,137 | 10/1989 | Govang et al. ........................... 206/597 |
| 4,913,290 | 4/1990 | deGroot . |
| 4,919,270 | 4/1990 | Govang et al. ........................... 206/597 |
| 5,219,116 | 6/1993 | Hearne . |
| 5,472,138 | 12/1995 | Ingram . |

FOREIGN PATENT DOCUMENTS

| | | |
|---|---|---|
| 2064445 | 10/1993 | Canada ................................... 206/597 |
| 0 514 063 A2 | 11/1992 | European Pat. Off. . |
| 0 608 038 A1 | 7/1994 | European Pat. Off. . |
| 2 692 557 | 12/1993 | France . |
| 2931337 | 2/1981 | Germany ................................ 206/597 |

Primary Examiner—Bryon P. Gehman
Attorney, Agent, or Firm—Fitch, Even, Tabin & Flannery

[57] ABSTRACT

An adjustable-length, reusable, recyclable pallet wrap for constraining a lading while displaying high-impact graphics. The pallet wrap preferably has a set of horizontally-spaced, vertically-oriented, preformed lines of reduced resistance to bending at each of four regions to facilitate providing a snug fit around typical pallets or ladings of various sizes. In one embodiment, a dual-function pallet wrap is provided which can function as a pallet skirt for in-store displays in addition to functioning as a constraint for the lading.

10 Claims, 1 Drawing Sheet

U.S. Patent     Apr. 18, 2000     6,050,419
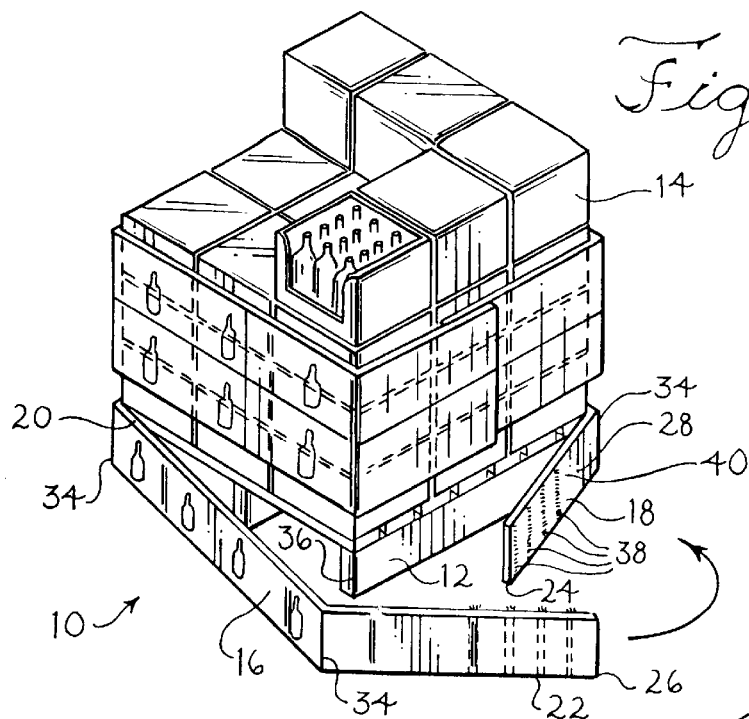
Fig. 2
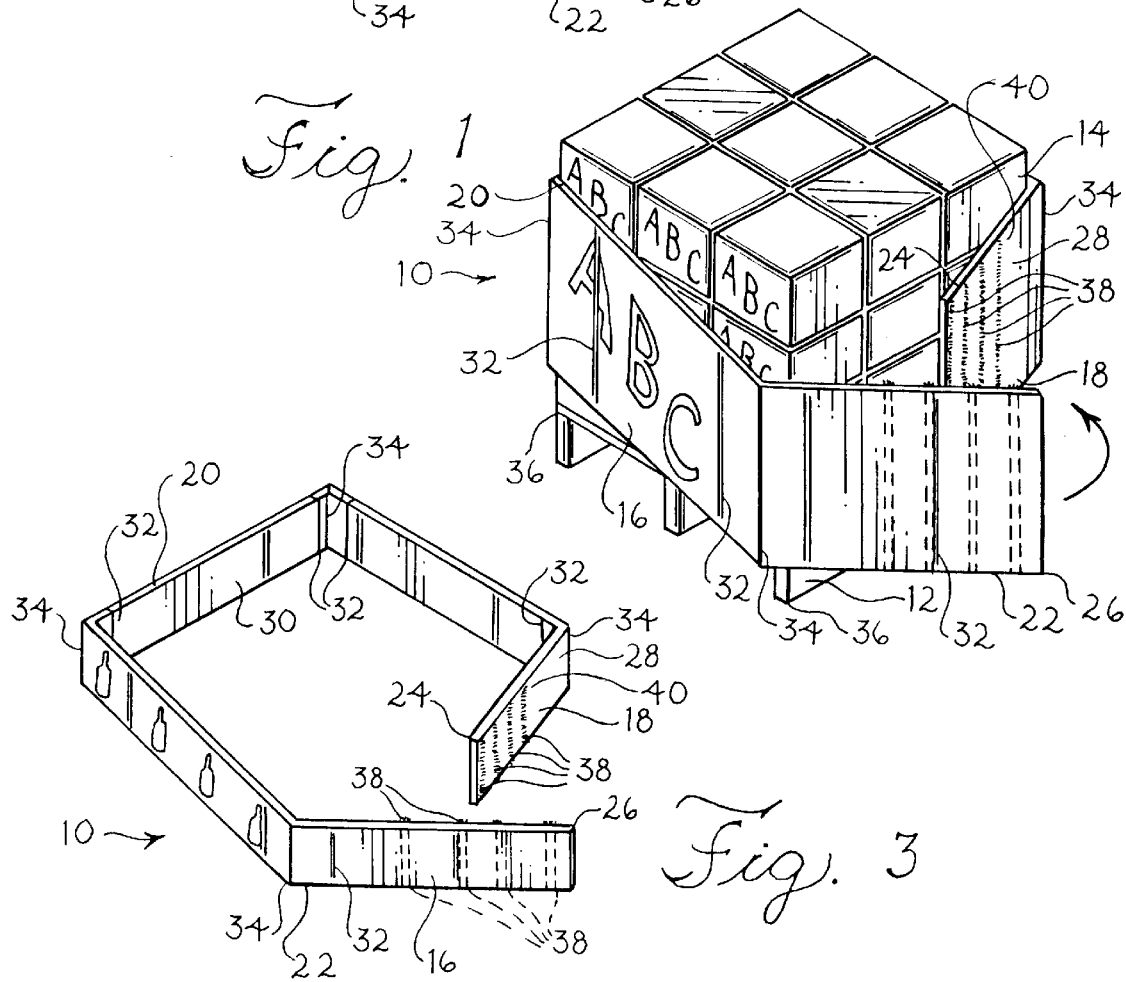
Fig. 1
Fig. 3

PALLET WRAP AND METHODS FOR STABILIZING AND DISPLAYING ARTICLES

BACKGROUND OF THE INVENTION

1. Field of the Invention

The invention relates generally to pallet wraps for stabilizing articles against shifting during transport, and for displaying products to consumers on a pallet, and to related methods.

2. Background and Description of Related Art

The stacking of articles, such as cases or cartons containing food products, on pallets having a horizontal supporting platform surface often presents stability problems. The stacked articles, which may be of the same or different shapes, sizes and weights, if unrestrained, may slide off of the pallet during transport.

One method of stabilizing pallet loads requires placing a loaded pallet on a turntable, and rotating the turntable through three or more complete revolutions while wrapping EVA stretch wrap around the load. The stretch wrap generally is not reusable, which requires a material cost to be incurred for each pallet load. Disposal of the stretch wrap may require an additional expense. Also, removal of the stretch wrap from the pallet may require it to be cut away using a knife or other tools in a labor-intensive operation, with care being needed to avoid damage to the lading. Another problem is that the EVA film may apply excessive pressure to the lading and may damage cartons, particularly under conditions of high humidity.

A general object of the invention is to provide a reusable pallet wrap which is inexpensive to manufacture, and which avoids the problems associated with use of stretch wrap as described above.

Additional objects and advantages of the invention are set forth hereinbelow, and are shown in the accompanying drawings.

SUMMARY OF THE INVENTION

The invention provides an adjustable, reusable, recyclable pallet wrap for stabilizing articles such as boxes or cartons containing food products on a pallet, while providing capability for display of high-impact graphics. In one embodiment, there is provided a dual-function pallet wrap which is capable of functioning as a constraint for cartons stacked on a pallet, and is also capable of being attached directly to the pallet to enable it to be returned with the empty pallet, and to enable it to function as a decorative skirt to cover the pallet for purposes of in-store display. The pallet wrap preferably employs a non-metallic fastening device which permits the ends of the pallet wrap to be adjustably and releasably fastened to each other. The pallet wrap preferably does not contain any metal components so as to avoid concerns regarding presence of small metal fasteners and the like in food plants. The pallet wrap preferably has sufficient strength to permit it to stabilize loads weighing from about 1,000 pounds up to about 2,500 pounds.

The pallet wrap preferably includes at least four horizontally-spaced series of vertically oriented, preformed regions of reduced resistance to bending to facilitate provision of an acceptably precise fit around ladings of various sizes.

Additional features of the invention are set forth below, and are shown in the accompanying drawings.

BRIEF DESCRIPTION OF THE DRAWINGS

FIG. 1 is a perspective view of a pallet wrap in accordance with a first embodiment of the invention;

FIG. 2 is a perspective view of a plurality of pallet wraps in accordance with a second embodiment of the invention, shown in use with a loaded pallet in an in-store display; and FIG. 3 is a perspective view of one of the pallet wraps of FIG. 2.

DETAILED DESCRIPTION OF PREFERRED EMBODIMENTS

The invention is preferably embodied in an adjustable, recyclable pallet wrap 10 which has a tensile and burst strength sufficient to constrain product loads weighing in the range from about 1,000 to about 2,500 pounds while enabling display of high-impact graphics on its outer surface 28. In the embodiments of FIGS. 2 and 3, the pallet wrap 10 is also capable of functioning as a display skirt for in-store display purposes to remove the pallet 12 from view, without impeding customer access to product on the pallet 12. In each of the embodiments described herein, the pallet wrap comprises an elongated, generally rectangular body 16 and a fastening mechanism 18 which preferably comprises one or more non-metallic fastening devices.

The pallet wrap 10 stabilizes articles 14 on the pallet 12, such as a lading comprising a plurality of food product boxes or cartons, to prevent the articles 14 from sliding relative to one another. The pallet wrap 10 does not have any small metallic parts which might become detached as a result of wear or damage.

The pallet wrap 10 is preferably made of a material having a burst strength of at least about 150 p.s.i., which is believed to be sufficient to constrain a product load weighing in the range from about 1,000 to about 2,500 pounds during typical commercial shipping and handling of food products such as bottles of salad dressing or packaged cheese, or other food products packaged for retail sale.

The size of the pallet wrap 10 will vary, depending upon the size of the lading being stabilized, and/or the size of the pallet 12. The pallet wrap 10 has a horizontal dimension which is sufficient to permit the pallet wrap 10 to wrap horizontally around the lading, or around the entire perimeter of the pallet 12 with its ends 24 and 26 overlapping.

If the pallet wrap 10 is used to stabilize two layers of articles 14 stacked on a pallet 12, it may have a relatively small vertical dimension, e.g., about seven inches. If a single pallet wrap 10 is used to stabilize three or more layers, it should have a vertical dimension which permits it to engage all of the layers, as shown in FIG. 1. Alternatively, two or more separate pallet wraps 10 may be used to stabilize three or more layers of stacked articles 14, with one engaging the first and second layers, and the other engaging the second and third layers, as shown in FIG. 2. The stabilization of additional layers can be performed in a similar manner, using additional pallet wraps 10.

If the pallet wrap 10 is to be used as a display skirt, it should be long enough to wrap around the entire perimeter of the pallet 12, with the ends 24 and 26 overlapping, and the vertical dimension of the pallet wrap 10, i.e., the distance between its upper and lower edges 20 and 22, may be substantially the same as that of the pallet 12 (FIG. 2).

FIG. 2 illustrates an in-store display wherein a plurality of dual-function pallet wraps are employed on a loaded pallet. Each of the illustrated pallet wraps is capable of functioning both as a load constraint and as a display skirt.

During transportation of a fully-loaded pallet with four layers of cartons stacked thereon, three pallet wraps may be employed, one at each interface between two adjacent layers. At the retail location, the top pallet wrap may be removed from the lading and wrapped around the pallet itself, as shown in FIG. 2, with illustration of the products in the cartons being provided on the pallet wraps for product identification purposes, as well as advertising purposes. As shown in FIG. 2, the pallet wrap extends about the entire periphery of the pallet, attached to the side surfaces of the pallet by a tight fit therearound to cover the sides of the pallet and remove them from view. As successive layers of cartons are opened, and product is removed therefrom, the other pallet wraps may be removed successively from top-to-bottom to expose the lower layers of cartons, with each successive pallet wrap being wrapped around the pallet. After all of the cartons have been emptied and removed, the pallet wraps may remain attached to the pallets for return to the distributor with the pallet. To this end, in the embodiment of FIG. 2, the vertical dimension of each pallet wrap is no greater than that of the pallet, and preferably is substantially the same as that of the pallet, so that the pallet wrap 10 does not project substantially above or below the top or bottom of the pallet.

The body 16 of the pallet wrap 10 preferably has a plurality of horizontally spaced series of vertically-oriented, preformed regions of reduced resistance to bending to facilitate provision of an acceptably precise fit around ladings of various sizes. These regions may take the form of vertical flexible fold lines 32 at locations corresponding to the corners of ladings or pallets of various sizes. Thus, the fold lines 32 can be positioned to align with the corners 36 of pallets or ladings of various sizes to provide a snug fit.

The body 16 of the pallet wrap 10 may comprise a continuous length of a recyclable material upon which high impact graphics, e.g., illustrations 36 (FIG. 2) of food products such as salad dressing bottles contained in the cases on the pallet, may be printed. Examples of suitable materials include corrugated paperboard or cardboard. One such material is 200 lb. B flute corrugated, which comprises a single-wall corrugated material having about 47 flutes/ft. and having a thickness of about ⅛ in, and a burst strength of at least about 200 p.s.i. The corrugations may be oriented either horizontally or vertically, but are preferably oriented vertically.

A fastening mechanism 18 connects and permits repeated adjustable joinder and release of the first and second ends 24 and 26 of the body 16 of the pallet wrap 10, with the ends overlapped, and permits the pallet wrap 10 to be repeatedly and easily formed into a continuous and endless band which may be varied in length.

The preferred fastening mechanism 18 comprises vertically-oriented complementary strips or patches of adhesive-backed hook-and-loop fastening material, such as VELCRO material, which are suitable for use with food products, and provide the pallet wrap 10 with the ability to be quickly fastened and unfastened at varying lengths. The fastening material 18 may be secured to the body 16 of the pallet wrap 10 by adhesive or otherwise.

As is shown in FIGS. 1–3, a series of vertically-oriented VELCRO strips 38 may be secured to the outer surface 28 of the pallet wrap 10 near the first end 24, and one or more complementary VELCRO strip may be secured to the inner surface 30 of the pallet wrap 10 near the opposite end 26. The fastener strips 38 may extend the full vertical dimension of the pallet wrap, and each may be, e.g., about one inch in width. The fastener strips 38 may be spaced at any desired intervals, e.g., intervals of 3 inches.

Alternatively, a single large VELCRO patch may be secured to the outer surface 28 of one end of the pallet wrap, and a complementary VELCRO strip or patch may be secured to the opposite second end 26.

The pallet wrap 10 of the invention may be manufactured efficiently and economically using commercially-available materials and equipment. For example, the body 16 of the pallet wrap 10 may be die-cut from a sheet of corrugated paperboard material. Fold lines 32 may be formed simultaneously, before, or after die-cutting of the body, in-line therewith, by employing dies to apply pressure to compress the material, or by employing cutting dies to perforate or score the material or to cut partially through its thickness. Fastening material may then be attached at the desired locations, in line with the other operations.

Although certain preferred embodiments of the pallet wrap and methods of the present invention have been shown and described herein, the invention is not limited to the embodiments described herein.

What is claimed is:

1. In combination, a pallet, a lading comprising a plurality of food product containers supported on said pallet, and at least one adjustable-length, reusable, dual function pallet wrap which is capable of being wrapped around said lading, each said pallet wrap comprising:

a length of corrugated material having a burst strength of at least about 150 p.s.i. extending about the lading, having an interior surface which engages the containers and an exterior surface having high-impact graphics printed thereon;

said length of corrugated material having overlapping end portions and having sets of horizontally-spaced, vertical lines of weakness at its corners to facilitate bending of the pallet wrap at its corners to facilitate providing a snug fit around loads of varying horizontal dimensions;

said end portions having complementary hook-and-loop fasteners thereon enabling said end portions to be adjustably and releasably attached to one another;

said pallet wrap being devoid of small metallic parts which might become detached therefrom as a result of wear or damage;

said pallet wrap being suitable for commercial use in constraining a lading during commercial shipping and handling thereof, and further being attachable to said pallet by wrapping said pallet wrap therearound and securing it in place with said fasteners, without said pallet wrap extending vertically beyond the upper and lower surfaces of the pallet, so that said pallet wrap can function as a skirt to cover the periphery of the pallet and display said high impact graphics in a retail store without interfering with removal of product from the pallet, and so that the pallet wrap may thereafter remain securely attached to the pallet so that it may be returned to the product distribution location with the pallet after removal of the lading.

2. A combination in accordance with claim 1 wherein each of said food product containers comprises a carton and a plurality of food products disposed within said carton, and said high impact graphics comprise a plurality of illustrations of said food products.

3. A combination in accordance with claim 2 wherein each said pallet wrap comprises a length of corrugated paperboard having a burst strength of at least about 200 p.s.i.

4. A combination in accordance with claim 2 wherein said at least one adjustable-length, reusable, dual function pallet wrap comprises at least two pallet wraps.

5. In combination, a pallet, a lading comprising a plurality of cartons supported on said pallet and a plurality of food product containers disposed in said cartons on said pallet, and at least one adjustable-length, reusable pallet wrap which functions as a constraint for the containers during shipping and handling, each said pallet wrap consisting of:

a length of corrugated material having a burst strength of at least about 150 p.s.i. extending about the lading, having an interior surface which engages the cartons and an exterior surface having high-impact graphics illustrating said food product containers printed thereon;

said length of corrugated material having overlapping end portions and having four sets of horizontally-spaced, vertically-oriented preformed lines of reduced resistance to facilitate providing a snug fit around loads of varying horizontal dimensions; and complementary hook-and-loop fasteners adhesively secured to said end portions enabling said end portions to be adjustable and releasable attached to one another;

said pallet wrap being devoid of metallic parts;

said pallet wrap being suitable for commercial use in constraining pallet loads of food product during commercial shipping and handling thereof.

6. A combination in accordance with claim 5 wherein said at least one adjustable-length, reusable, pallet wrap comprises at least two pallet wraps.

7. A combination in accordance with claim 5 wherein said complementary hook-and-loop fasteners comprise, on each of said end portions, a series of horizontally spaced, vertically oriented strips of hook-and-loop fastener material providing adjustability for said pallet wrap.

8. A method of using a pallet wrap comprising:

placing a lading comprising a plurality of cartons and a plurality of food product containers disposed in said cartons on a pallet;

providing a reusable corrugated pallet wrap having a vertical dimension not substantially greater than that of said pallet, and having graphics thereon;

securing said pallet wrap around said cartons so as to constrain said cartons during shipping and handling;

transporting said pallet, lading and pallet wrap to a retail location; and releasing said pallet wrap and wrapping it around the periphery of the pallet to cover the sides of said pallet and display said graphics at said retail location.

9. A method in accordance with claim 8 wherein said pallet wrap comprises a length of corrugated material having a burst strength of at least about 150 p.s.i. and has an exterior surface having high-impact graphics relating to said food product containers thereon, said length of corrugated material having overlapping end portions and having four sets of horizontally-spaced, vertically-oriented preformed lines of reduced resistance to facilitate providing a snug fit around loads of varying horizontal dimensions, said length of corrugated material further including complementary hook-and-loop fasteners adhesively secured to said end portions enabling said end portions to be adjustably and releasably attached to one another, said pallet wrap being devoid of metallic parts, and said pallet wrap being suitable for commercial use in constraining pallet loads of food product during commercial shipping and handling thereof.

10. A method in accordance with claim 8 wherein said pallet wrap has a vertical dimension not substantially greater than that of said pallet so as to be attachable about said pallet without projecting significantly above or below said pallet.

\* \* \* \* \*